United States Patent
Ferrara et al.

(10) Patent No.: US 8,028,902 B2
(45) Date of Patent: Oct. 4, 2011

(54) METHODS FOR PROVIDING STAND-IN SERVICES FOR TRANSACTION CARD CUSTOMIZATION

(75) Inventors: Tom Ferrara, Webster Groves, MO (US); Anna Whelan, Florissant, MO (US); Peter Weinberger, New Fairfield, CT (US)

(73) Assignee: MasterCard International Incorporated, Purchase, NY (US)

( * ) Notice: Subject to any disclaimer, the term of this patent is extended or adjusted under 35 U.S.C. 154(b) by 683 days.

(21) Appl. No.: 11/749,689

(22) Filed: May 16, 2007

(65) Prior Publication Data

US 2007/0267484 A1    Nov. 22, 2007

Related U.S. Application Data

(60) Provisional application No. 60/800,947, filed on May 17, 2006.

(51) Int. Cl.
*G06K 5/00*    (2006.01)

(52) U.S. Cl. ........................................................ 235/380
(58) Field of Classification Search .................. 235/380, 235/379; 705/35
See application file for complete search history.

(56) References Cited

U.S. PATENT DOCUMENTS

| | | | |
|---|---|---|---|
| 2004/0254833 A1 | 12/2004 | Algiene | |
| 2005/0055296 A1* | 3/2005 | Hattersley et al. | 705/35 |
| 2007/0075134 A1* | 4/2007 | Perlow et al. | 235/380 |
| 2007/0102510 A1* | 5/2007 | Beemer et al. | 235/380 |
| 2007/0246526 A1* | 10/2007 | Elgar et al. | 235/380 |

* cited by examiner

*Primary Examiner* — Seung Lee
(74) *Attorney, Agent, or Firm* — Sheppard, Mullin, Richter & Hampton LLP; David E. Heisey

(57) ABSTRACT

The present invention is directed to methods for providing stand-in services for transaction card customization, wherein a transaction card franchiser provides the stand-in services for the transaction card issuer with regard to transaction card applicant email notification with respect to approval/rejection decisions and/or billing the transaction card applicant for the cost of a new transaction card on behalf the transaction card issuer.

7 Claims, 3 Drawing Sheets

METHODS FOR PROVIDING STAND-IN SERVICES FOR TRANSACTION CARD CUSTOMIZATION

REFERENCE TO RELATED APPLICATIONS

This application claims the benefit of U.S. Provisional Patent Application Ser. No. 60/800,947, filed May 17, 2006, the content of which is incorporated herein by reference in its entirety.

FIELD OF THE INVENTION

The invention broadly relates to transaction card customization and more particularly to methods for providing stand-in services for transaction card customization.

BACKGROUND OF THE INVENTION

Transaction cards, such as credit cards, debit cards, membership cards, promotional cards, frequent flyer cards, and identification cards, are widely used throughout the world. Such transaction cards may include a variety of different indicia to identify the card, the individual using the card, a transaction account (e.g., a transaction card account), and other features. The indicia may include a string of alphanumeric characters, a bar code or an encoded magnetic strip attached to the card. Transaction cards related to financial transactions have a magnetic stripe which runs longitudinally across the face of one side of the card and have a plurality of numbers, expiration date and a name embossed thereon.

It is known to apply a customized image to a membership card, debit card, or other transaction card. Specifically, the customized image may be created and applied to the card from a remote location such as at the applicant's computer, wherein the applicant may edit the customized image using software operated by a website server. However, such methods suffer from a number of known drawbacks, including a failure to provide stand-in services for transaction card customization.

SUMMARY OF THE INVENTION

The present invention is directed to methods for providing stand-in services for transaction card customization, wherein a transaction card franchiser provides the stand-in services for the transaction card issuer with regard to transaction card applicant email notification with respect to approval/rejection decisions and/or billing the transaction card applicant for the cost of a new transaction card on behalf the transaction card issuer.

According to the invention, a preferred method for providing email notification for transaction card customization on behalf of a transaction card issuer comprises the steps of (i) receiving a customized transaction card image that is submitted for approval by a transaction card applicant, (ii) storing the customized image on a database of a transaction card franchiser, (iii) sending email information of the applicant to an email generation engine, (iv) reviewing the customized image submitted by the applicant, (v) approving or rejecting the customized image and (vi) generating an approval or rejection email and sending the email to the applicant. More particularly, steps (i), (ii), (iii), (iv) and (v) are performed by the transaction card issuer, while step (vi) is performed by the transaction card franchiser on behalf of the transaction card issuer. The customized image may be submitted for approval by the transaction card applicant using a card customization services website of the transaction card issuer, wherein the applicant is prompted to provide email information along with the customized image. In step (v), an image reviewer of the transaction card issuer approves or rejects the customized image based on predetermined image guidelines. In step (vi), the approval or rejection email may comprise an automatically generated, pre-formatted, approval or rejection email.

According to further embodiments of the invention, a method for providing email notification for transaction card customization on behalf of a transaction card issuer, comprises the steps of (i) receiving a customized transaction card image that is submitted for approval by a transaction card applicant, (ii) storing the customized image on a database of a transaction card franchiser, (iii) sending email information of the applicant to an email generation engine, (iv) approving or rejecting the customized image, and (v) generating an approval or rejection email and sending the email to the applicant, wherein steps (i), (ii), (iii) and (iv) are performed by the transaction card issuer, and wherein step (v) is performed by the transaction card franchiser on behalf of the transaction card issuer.

In accordance with the principles of the invention, a preferred method for billing an applicant on behalf of a transaction card issuer comprises the steps of (i) sending an approved customized transaction card image of an applicant to a database of the transaction card issuer, (ii) sending information about the applicant and the cost of the new transaction card to a transaction formatter, (iii) reformatting the information to produce a billing authorization record and submitting the record to a clearing system of a transaction card franchiser, (iv) directly applying the cost of the new transaction card to an account of the applicant within a billing system of the transaction card issuer, and (v) mailing an invoice statement to the applicant including the cost of the new transaction card. Steps (i), (ii), (iii) and (v) are performed by the transaction card issuer, whereas step (iv) is performed by the transaction card franchiser on behalf of the transaction card issuer. According to some embodiments, step (ii) is performed using a secure transfer mechanism including a franchiser firewall, and step (iii) is performed by the transaction formatter.

Additional embodiments of the invention involve a method for billing a transaction card applicant for the cost of a new customized transaction card on behalf of a transaction card issuer, comprising the steps of (i) sending an approved customized transaction card image of an applicant to a database of the transaction card issuer, (ii) producing a billing authorization record including the cost of the new transaction card and submitting the record to a clearing system of a transaction card franchiser, and (iii) directly applying the cost of the new transaction card to an account of the applicant within a billing system of the transaction card issuer. Steps (i) and (ii) are performed by the transaction card issuer, while step (iii) is performed by the transaction card franchiser on behalf of the transaction card issuer. The billing authorization record may be produced by a transaction formatter, which reformats information about the applicant and the cost of the new transaction card, wherein this information is sent to the transaction formatter using a secure transfer mechanism including a franchiser firewall. The method may further comprise the step of mailing an invoice statement to the applicant including the cost of the new transaction card.

DETAILED DESCRIPTION

Figure 1:
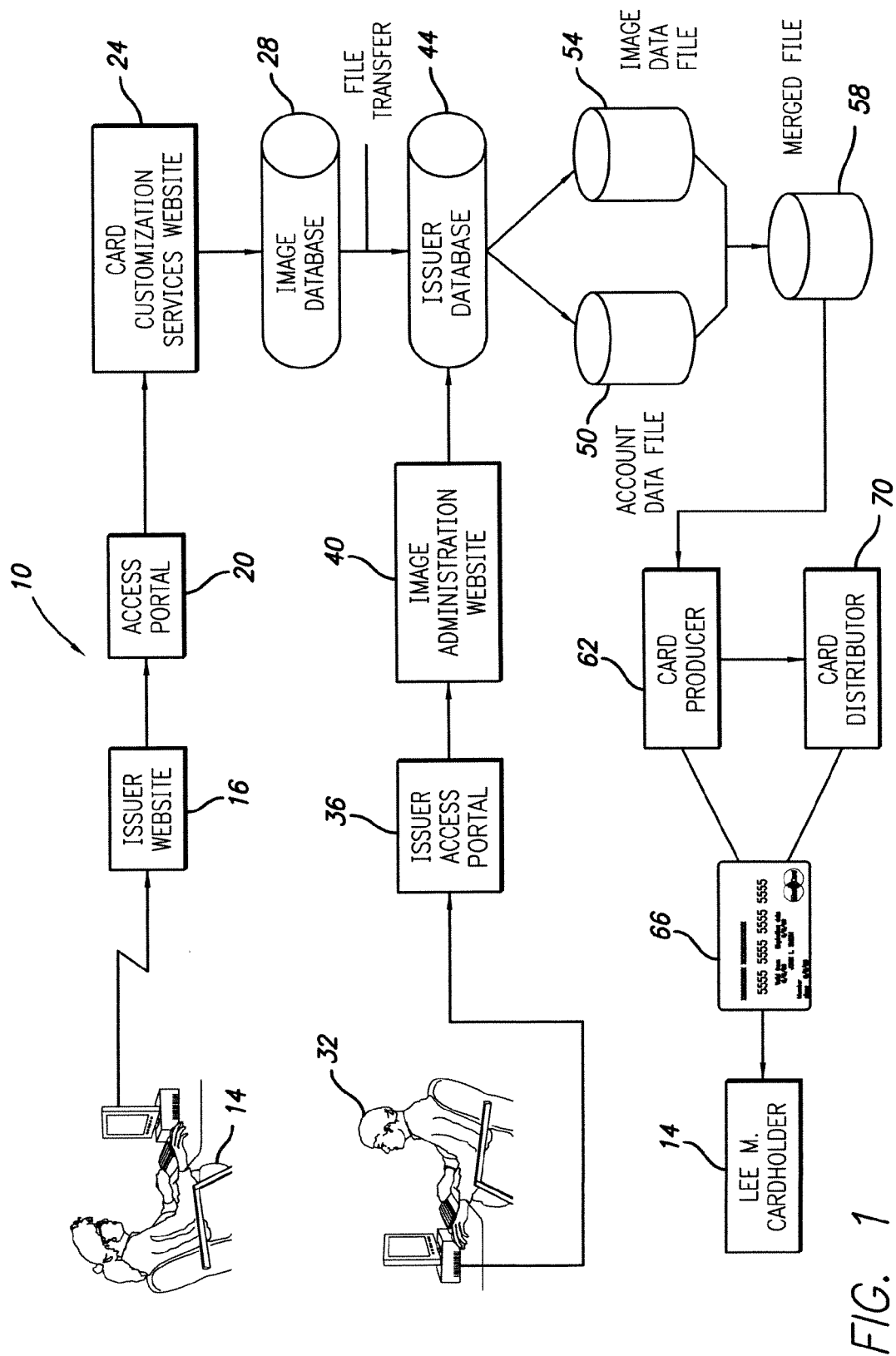
FIG. 1 is a schematic diagram illustrating card customization process flow, in accordance with the principles of the present invention.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is directed to methods for providing stand-in services for transaction card customization. For example, the invention discloses a method for providing email notification for transaction card customization on behalf of a transaction card issuer, comprising the steps of logging onto a card customization services website and submitting a customized image, storing the customized image on a franchiser database, sending the applicant's email information to an email generation engine, reviewing the customized image submitted by the applicant, approving or rejecting the customized image based on predetermined image guidelines, and automatically generating a pre-formatted approval or rejection email that is sent to the applicant. It should be appreciated by those of ordinary skill in the art that the principles described herein may be applied to many types of transaction cards such as debit cards, credit cards, ATM cards, membership cards, identification cards and frequent flyer cards, without departing from the scope of the invention.

Another method of the invention involves billing applicants on behalf of a transaction card issuer. In particular, the method comprises the steps of sending approved customized images to an issuer database, sending basic information about the applicant and an associated transaction to a transaction formatter, reformatting the information to produce a billing authorization record and submitting the record to a clearing system, directly applying a transaction to the appropriate applicant account in the issuer's billing system, and mailing an invoice statement to the applicant.

According to the principles of the invention, custom-designed transaction cards may be provided for both existing and new applicants. Customization may be offered through a country-specific website for new accounts during the application process or for existing accounts after log-on has occurred. The card customization process enables applicants to customize the front of the card using a dedicated website that is accessed through the issuer's website. Applicants may select personal photos, artwork or any image (subject to image-review standards) for placement on the card. The customization process allows applicants to upload a personal image, refine and design the final look of the card, and submit the final image for image review. The invention is designed to facilitate complete issuer control with minimal impact to the internal acquisition and account maintenance infrastructure. Issuers manage digital images stored on a card customization system, while functional tools available to issuers accommodate image approval or rejection for printing subject to predetermined minimum design standards. Upon approval, an image file is created and sent to the issuer. The issuer then formats the print image and applicant account information (e.g., applicant name, account number, and expiration date) into a merged record. A file is created and sent to the issuer's selected card production service provider for printing, personalization and distribution.

Referring to FIG. 1, a flowchart 10 is provided illustrating the card customization process flow including custom card image creation, issuer image review, and card production. Initially, an applicant 14 accesses an issuer website 16. Upon entering the appropriate information such as an applicant name and password, the applicant 14 is passed through an access portal 20 to a card customization services website 24 (provided by a transaction card franchiser) for adding a customized image on a front surface of their transaction card. In accordance with the principles of the invention, the customized image is subject to review by the issuer and/or an image administrator of the franchiser.

With further reference to FIG. 1, custom card image creation is performed on the card customization services website 24, whereby the applicant 14 uploads a personal image, creates a custom image and submits the image to the issuer for approval. This information may be stored in a franchiser image database 28 as well as in an issuer database 44. With respect to issuer image review, an issuer 32 may access an online image administrator website 40 via an issuer access portal 36. On the image administrator website 40, the issuer 32 conducts an image review and submits the results including an approval or rejection of the image to the issuer database 44. For each applicant 14, an account data file 50 from the issuer database 44 is combined with a corresponding image data file 54 from the issuer database 44 to form a composite merged file 58. With regard to card production, the merged file 58 is sent to a card producer 62 for production and distribution of the customized card 66 to the appropriate applicant 14. The process may optionally involve a card distributor 70, such as a bank or other distributor, for delivering the customized card 66 to the appropriate applicant 14.

Figure 2:
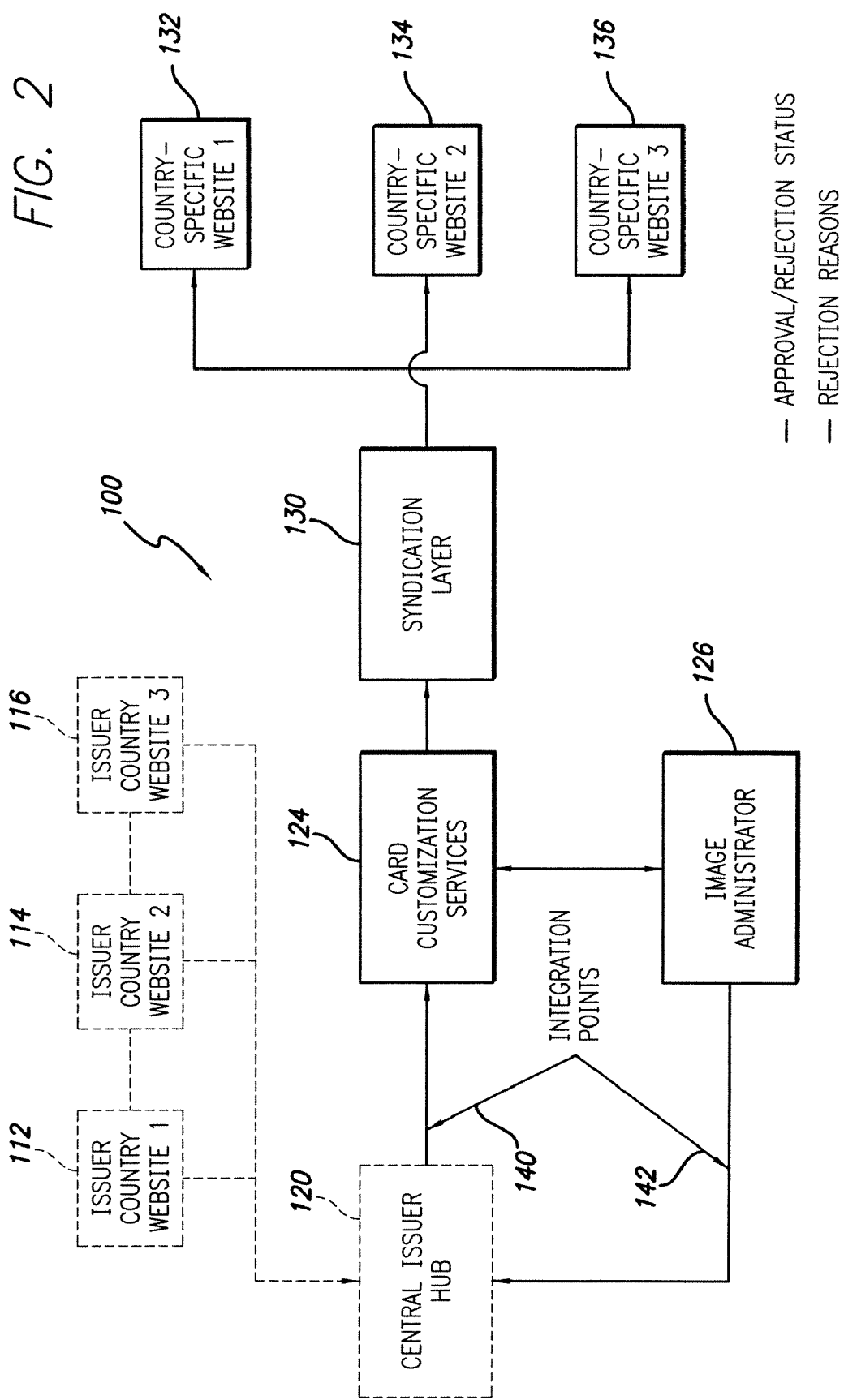
FIG. 2 is a schematic diagram illustrating a system for transaction card customization, in accordance with the principles of the present invention.

Referring to FIG. 2, a system 100 for transaction card customization in accordance with the principles of the present invention comprises a plurality of issuer country websites 112, 114, 116, a centralized issuer hub 120, card customization services 124, an image administrator 126, a syndication layer 130, and a plurality of dedicated country-specific websites 132, 134, 136. The system 100 of the invention provides a centralized solution offering a single point of website integration. Applicants may enter the system 100 at a browser-based user interface through their local issuer country website 112, 114, 116. Each local issuer country website 112, 114, 116 may be implemented using its own proprietary computer software application. The image administrator 126 may be implemented using a computer software application comprising machine readable or interpretable instructions for controlling a remote image processor for approving or rejecting various applicant images. After card customization, the system 100 may be employed to route card customization files to one or more card finishers for production.

According to the invention, the centralized issuer hub 120 may comprise a server that coordinates all traffic among the issuer country websites 112, 114, 116, the card customization services 124, and the image administrator 126. Card customization services may comprise a website 124 that recognizes the issuer country and processes applicant requests. In this manner, information provided by the applicant is used to launch a dedicated country-specific website 132, 134, 136, whereby the syndication layer 130 "wraps" the correct country-specific content around a base website and serves up a country-specific version of the base website to the applicant's browser. The base website includes the core components that make up the consumer-facing card customization software application, wherein the same base code may be reused for all customers. The base website includes basic features and functionality without any issuer-specific enhancements or issuer-specific branding such as foreign language, colors, artwork and website links.

With further reference to FIG. 2, the card customization services website 124 may be implemented using a computer software application comprising machine readable or interpretable instructions for manipulation of remote images. In particular, the software application may comprise a browser-based user interface displaying a graphical representation of an image that is uploaded by an applicant from a remote location, wherein the image may be manipulated by the applicant from the remote location. By way of example, the original applicant image may be uploaded from the customer's own computer. Regarding image manipulation, the applicant may perform operations such as image rotating, image re-sizing, image flipping, image mirroring, and image positioning including placing the original image within a window region of the card. According to the invention, the final image displayed on the transaction card may be restricted to a pre-determined area on the transaction card, such that the rest of the card may contain features such as logos, holograms and card type indicators.

In operation, the card customization services website 124 preferably mirrors the issuer country website 112, 114, 116. Accordingly, issuers participating in the program coordinate with card customization services to prepare system interface branding elements and artwork that appear on both websites. Elements for such system interface branding may include without limitation: (1) an issuer logo; (2) a link for issuer home in the footer; (3) a link for privacy policy in the footer; (4) a link for "Contact Us" in the footer; (5) terms and conditions; (6) a card customization and tag line; (7) all images on the site; (8) a site language translation (if not English); (9) a color scheme for header, text and buttons; (10) font; (11) frequently asked questions; (12) an approved electronic card form in vector format. In addition, a vector card format file may appear as an "overlay" to provide applicants with a substantially exact replica of the card as it will be received. Accordingly, the overlay preferably shows all account information placement (i.e., "valid thru" date, embossing, issuer logo, etc.) and card attributes (i.e., MIA, engraved areas, etc).

Upon completion of the applicant image submission and return to the appropriate issuer country website 112, 114, 116, card customization information is stored on the issuer country website 112, 114, 116 using a token unique-ID and the image file name. Issuers receive the images and image information from card customization services 124 for storage after receiving custom card image approval or rejection. For example, card customization services 124 may create a zip file of card images for transmission to the issuer. The zip file may contain one or more image files created using an image ID as the filename and a comma separated value (CSV) file having fields including, but not limited to (i) image ID, (ii) date created, (iii) status date (last action date), (iv) status (approved or rejected), (v) reject reason ID (if applicable), and With further reference to FIG. 2, the system 100 includes one or more integration points 140, 142 wherein the card customization software application interacts with the issuer's software application. More specifically, integration point 140 is disposed between the central issuer hub 120 and card customization services 124. At integration point 140, the issuer's software application is integrated with the card customization software application, such that the applications function substantially seamlessly as one consistent application. Another point of integration (integration point 142) is disposed between the central issuer hub 120 and the image administrator 126. At integration point 142, the issuer's application software is integrated with the image administrator software application, so that the applications function substantially seamlessly as one consistent application. Particularly, integration point 142 refers to the transfer of approved or rejected image information to the issuer country website 112, 114, 116, so that the appropriate issuer knows which cards to produce, and which cards to pass to their customer service department (e.g., for cards containing rejected images).

In accordance with the principles of the invention, the issuer country websites 112, 114, 116 are the entry point for an applicant to locate their issuer (e.g., the applicant's on-line banking provider). When the applicant is passed to card customization services 124 to complete the customization function, the applicant is served up a dedicated country-specific website 132, 134, 136 for card customization. According to the invention, each dedicated country-specific website 132, 134, 136 may contain its own language, branding, advertising and other qualities, depending on the country of origin of the selected issuer country website 112, 114, 116. Additionally, the preferred system 100 of the invention provides an automatic upgrading of all dedicated websites 132, 134, 136 simultaneously. More particularly, any changes applied to base website functionality may be automatically enabled on each issuer country website 132, 134, 136. Otherwise, the appropriate changes would have to be entered manually with respect to each individual dedicated website 132, 134, 136.

Figure 3:
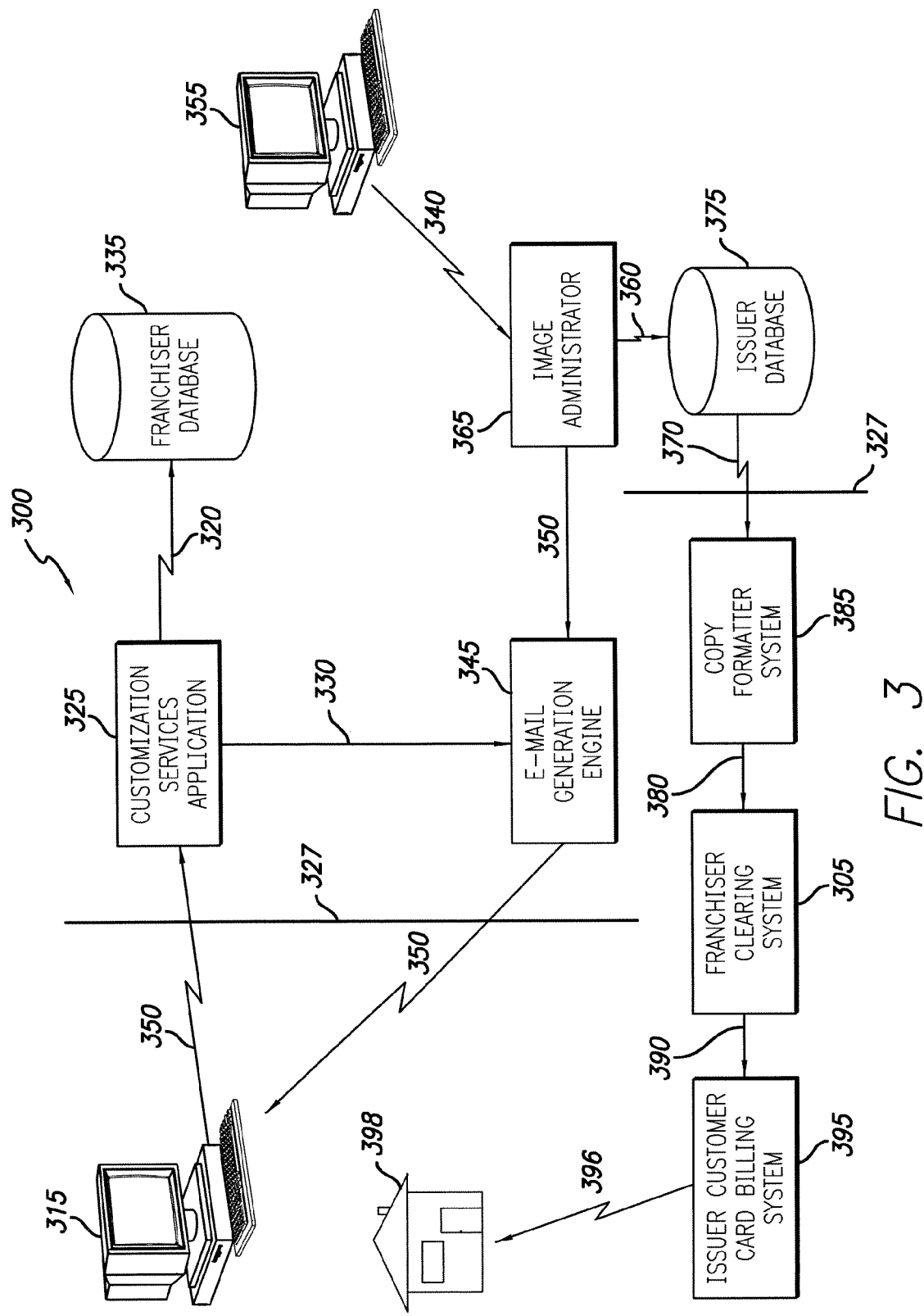
FIG. 3 is a schematic diagram illustrating preferred methods for providing stand-in services for transaction card customization, in accordance with the principles of the present invention.

Referring to FIG. 3, in accordance with the principles of the invention, various methods for providing stand-in services 300 for transaction card customization will now be described. In particular, a transaction card franchiser provides stand-in services for a transaction card issuer with regard to (i) applicant email notification, and (ii) applicant billing on behalf the transaction card issuer. With respect to email notification, in step 310 an applicant 315 on an issuer website logs onto a card customization services website 325 (having a firewall 327) and submits a customized image and an appropriate email address. Step 320 involves storing the customized image on a transaction card database 335 of the transaction card franchiser. In step 330, the applicant's email information is sent to an email generation engine 345.

In step 340, an image reviewer 355 of the transaction card issuer logs onto the image administrator 365 and reviews the customized image submitted by the applicant 315. After reviewing the customized image, the image reviewer 355 approves or rejects the image content based on predetermined image guidelines. Step 350 involves the image administrator 365 utilizing the email generation engine 345 to automatically generate a pre-formatted approval or rejection email that is sent to the applicant 315. In this manner the transaction card franchiser stands-in for the transaction card issuer on a key customer service contact.

With further reference to FIG. 3, a preferred method for providing stand-in services 300 for billing an applicant 315 on behalf of a transaction card issuer will now be described. Specifically, the transaction card franchiser has the unique ability to submit a billing transaction directly to a franchiser clearing system 305, thus facilitating a direct charge to the applicant 315 on behalf of the transaction card issuer for the express purpose of billing for the cost of a newly ordered customized transaction card. According to the method, the transaction card issuer permits the transaction card franchiser to bill the applicant 315 for the cost of the newly ordered customized transaction card, without having to generate the billing transaction internally.

The preferred method for providing stand-in services 300 for billing an applicant 315 on behalf of a transaction card issuer begins with step 360, wherein the image administrator 365 sends approved customized images to an issuer database 375. Step 370 involves the transaction card issuer sending basic information about the applicant 315 and the associated transaction (e.g., cost, etc.) to a transaction formatter 385 of the transaction card franchiser using a secure transfer mechanism including the franchiser firewall 327. In step 380, the information is reformatted to produce a billing authorization record, which is then submitted to the franchiser clearing system 305. In step 390, a transaction is directly applied to the appropriate applicant account in the issuer's customer card billing system 395. This step is performed by the transaction card franchiser on behalf of the transaction card issuer. In step 396, the transaction card issuer mails an invoice statement to the home 398 (or other billing address) of the appropriate applicant 315.

The image administrator 126 disclosed herein is used in the process of image approval, rejection and review. Using a predetermined set of image guidelines (such as including a list of prohibited subject matter), an issuer reviewer 315 decides whether to approve or reject the image. To approve an image, an "Approve" button is clicked followed by a "Submit" button, which completes the review/approval process. Rejected images follow the same process except that a "Reject" button is clicked and a series of reject reason descriptors are displayed, wherein all reject reasons that apply are checked. Additionally, the image administrator 126 may include an image archive that stores previously reviewed images. This information is used to provide an historical reference to provide precedence with respect to the types of images that have been approved or rejected. Each stored image may be referenced by the date of approval or rejection, the original date of receipt, the date of initial review and the reasons for rejection. The image administrator 126 preferably provides issuer reviewers 315 with various tools for image review. These image administrator tools may be accessed through the centralized issuer hub 120.

According to the invention, card issuers are responsible for providing initial image review including the rejection of inappropriate images. Prohibited subject matter for a customized images on any transaction card may include without limitation: (1) sexual subject matter of any nature; (2) political subject matter of any nature (except if the affinity or co-branded partner is a political organization); (3) offensive racial/prejudicial subject matter of any nature; (4) offensive religious subject matter of any nature; (5) advertising of any nature; (6) a portrait of an adult (including the applicant) intended for identification purposes; (7) self-promotion of any nature (e.g., personal business card); (8) copyrighted material of any nature; (9) branded products/services, including abbreviations, acronyms and/or symbols of any nature (except those identities approved for co-branded card programs); (10) solicitations, including telephone numbers or services of any nature (e.g., 900 or 800 numbers); (11) celebrities, musicians, athletes, entertainers, public figures, etc., of any nature; (12) affiliation with groups that are determined to be of a "socially unacceptable" nature; (13) subject matter of any nature that might result in card acceptance confusion by merchants; and (14) subject matter of any nature that might result in card fraud.

According to the invention, applicant access to the card customization services website is initiated through a selected issuer country website by creating a message requesting access to the card customization website. An issuer created token may required in the header area of the message to identify the issuer as a participant in the program prior to website connection. By way of example, tokens may be created using various data elements including bank name, ICA, returning URL, portfolio and a unique ID. The returning URL data element contains the card customization services web address. The unique ID data element uniquely identifies an applicant and facilitates mapping of the custom card image to the transaction card. Accordingly, each applicant access request contains a unique ID regardless of whether two or more applicants are "linked" to the same account. For example, if a husband and wife are sharing an account (i.e., both applicants are "linked" to the same primary account number) and each submits an access request for a custom card image, a separate unique ID is created for each submission.

The browser-based user interface is used to locate a preferred applicant image, select the image and upload the image. Image upload may be from a scanner, internet or any other medium device able to interface with the applicant's computer. Card customization may involve the use of image manipulation functions that allow applicants to rotate, flip, reset or resize the custom image to reflect the exact position the image will appear on the card. Using WYSIWYG ("What You See Is What You Get") technology, the card image shown on the site will be substantially an exact replica of what will appear on the actual issued card. Once the applicant has determined the precise image fit on the card, the design may be previewed prior to submission. If satisfied, the applicant selects a "Submit" button and the confirmation screen appears.

The resulting image files are very large given the amount of pixels each image requires, thus presenting certain challenges with respect to file transfer and storage. Accordingly, operations and systems efforts are coordinated to ensure maximum efficiencies in file processing. Issuers participating in the program may provide information concerning projected system use including the number of card programs to be employed. Additionally, for each program provided, the issuer may provide information including, but not limited to: (1) the number of applicants in the program; (2) the projected percentage of applicant participation in the program; (3) the projected rate of applicant custom image requests (e.g., number of cards per time period); (4) the number of years the program is expected to reach its peak; (5) the timing of planned promotions/advertising that would direct traffic to the site to include the expected increase in traffic resulting from the promotion/advertising; (6) the capacity of the internet connection to the server on which the image file will be received; and (7) the estimated image size (maximum of two megabytes for each image).

Thus, it is seen that methods for providing stand-in services for transaction card customization are provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The invention claimed is:

1. A method for a transaction card franchiser providing email notification for transaction card customization as a stand-in service on behalf of a transaction card issuer, comprising the steps of:
   the transaction card franchiser receiving a customized transaction card image, wherein the customized transaction card image is submitted for approval by a transaction card applicant to the transaction card issuer;
   the transaction card franchiser storing the customized image on a database of the transaction card franchiser;
   the transaction card franchiser providing email information of the applicant to an email generation engine as a stand-in service on behalf of the transaction card issuer, wherein the email information of the applicant was received from the transaction card issuer;
   the transaction card franchiser providing a transaction card issuer access portal that provides access to the database to the transaction card issuer and allows the transaction card issuer to review the customized image submitted by the applicant;
   the transaction card franchiser receiving an approval or rejection of the customized image, wherein the approval or rejection is determined by the transaction card issuer; and
   the transaction card franchiser generating an approval or rejection email and sending the email to the applicant.

2. The method of claim 1, wherein the customized image is submitted for approval by the transaction card applicant using a card customization services website of the transaction card issuer.

3. The method of claim 2, wherein the applicant is prompted to provide the email information along with the customzied image.

4. The method of claim 1, wherein an image reviewer of the transaction card issuer approves or rejects the customized image based on predetermined image guidelines.

5. The method of claim 1, wherein the approval or rejection email comprises an automatically generated, pre-formatted, approval or rejection email.

6. The method of claim 1, further comprising the step of generating an audit trail of the customized image and emailing the audit trail to the issuer and the applicant.

7. The method of claim 1, further comprising the transaction card franchiser receiving account information about the applicant and merging the customized image and the account information to generate a composite merged file.

* * * * *